(12) United States Patent
Smith

(10) Patent No.: US 6,215,276 B1
(45) Date of Patent: Apr. 10, 2001

(54) PORTABLE SELF CONTAINED BATTERY CHARGER AND RADIO

(76) Inventor: Charles P. Smith, 21 Coral Way, Winter Springs, FL (US) 32708

( * ) Notice: Subject to any disclaimer, the term of this patent is extended or adjusted under 35 U.S.C. 154(b) by 0 days.

(21) Appl. No.: 09/506,564

(22) Filed: Feb. 18, 2000

(51) Int. Cl.$^7$ .................................................. H01M 10/46
(52) U.S. Cl. ........................... 320/111; 320/112; 320/114
(58) Field of Search ..................................... 320/105, 110, 320/111, 112, 113, 114, 115

(56) References Cited

U.S. PATENT DOCUMENTS

| | | |
|---|---|---|
| D. 307,829 | 5/1990 | Hasuike . |
| 2,591,438 | 4/1952 | Kinman et al. . |
| 4,214,197 | 7/1980 | Mann et al. . |
| 4,691,383 | 9/1987 | Demars . |
| 5,187,422 | 2/1993 | Izenbaard et al. . |
| 5,396,162 | 3/1995 | Brilmyer . |
| 5,404,419 | * 4/1995 | Artis, Jr. . |
| 5,752,205 | 5/1998 | Dzung et al. . |

* cited by examiner

*Primary Examiner*—Edward H. Tso

(57) ABSTRACT

A portable self contained battery charger and radio for charging batteries for power tools. The portable self contained battery charger and radio includes a portable housing having a top wall which is removable from the housing. A first plug is adapted for connecting to a home electrical power outlet. The first plug is a two prong plug operationally coupled to a first cord. A second plug for a vehicle power outlet is a cylinder having a first end and a second end. A wall connects the first and second ends. The first end has an electrical contact thereon and the wall of the second plug has an electrical contact thereon. The second end of the second plug is affixed to a second cord such that the first and second electrical contacts of the second plug are electrically coupled to the second cord. The first and second plugs provide power. A power cell for transforming current is mounted within the housing and has an outlet therein adapted to receive two pronged plugs. The power cell is operationally coupled to the power supply. A sound system for transforming audio and radio signals into sound is mounted in the housing and operationally coupled to the power cell. Two speakers are mounted in the front wall, each of which is operationally coupled to the sound system. A rechargeable battery for supplying power to the power cell is operationally coupled to the power cell. A recharger compartment for inserting battery rechargers is within the housing.

8 Claims, 4 Drawing Sheets

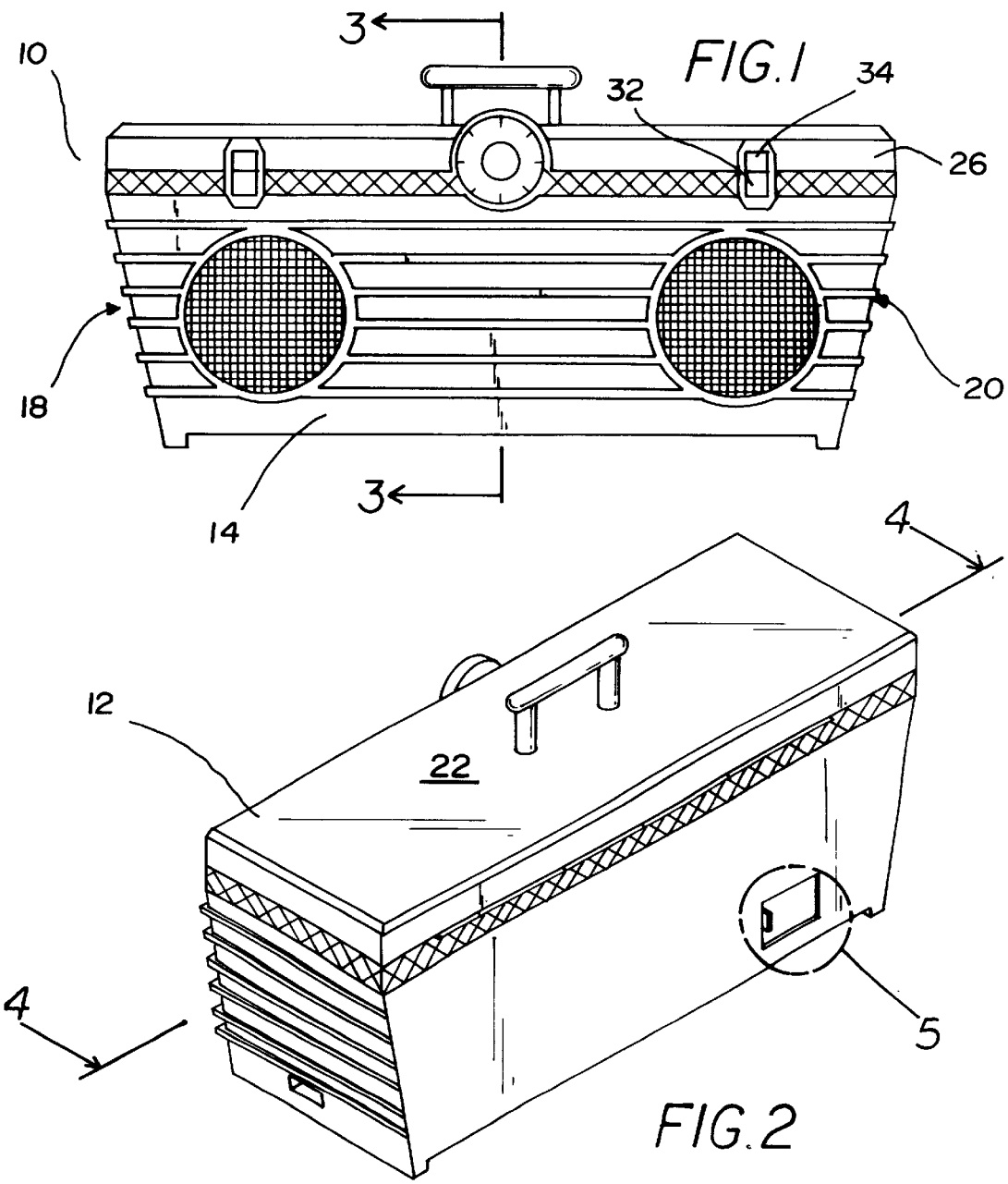

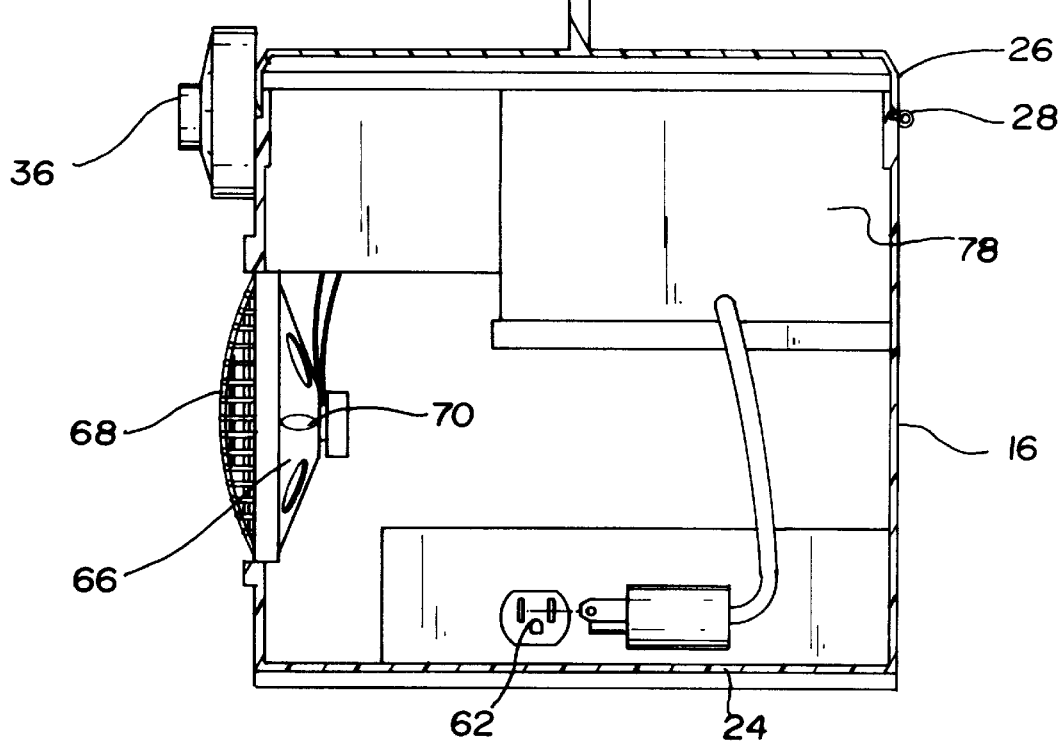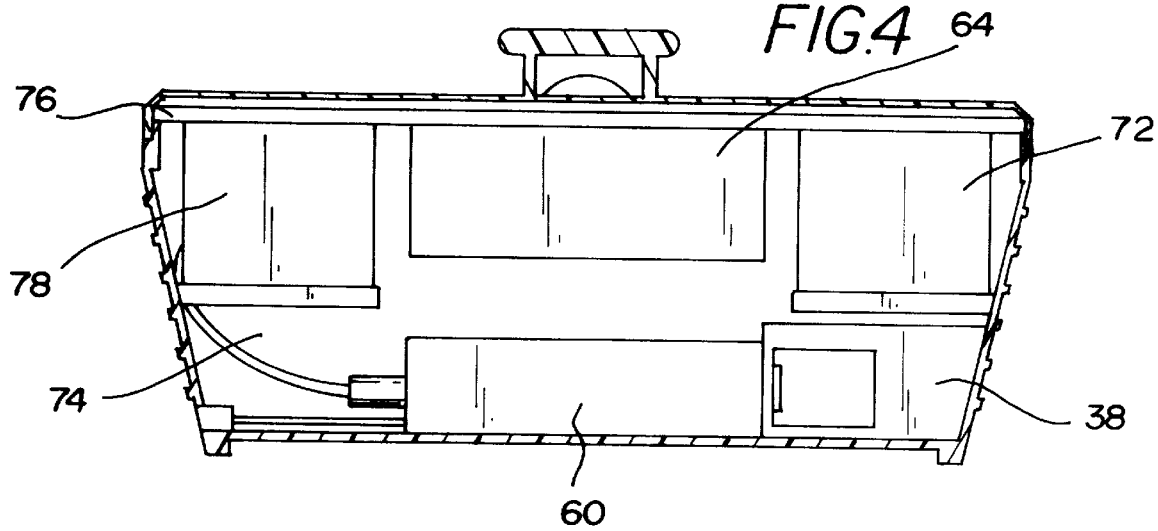

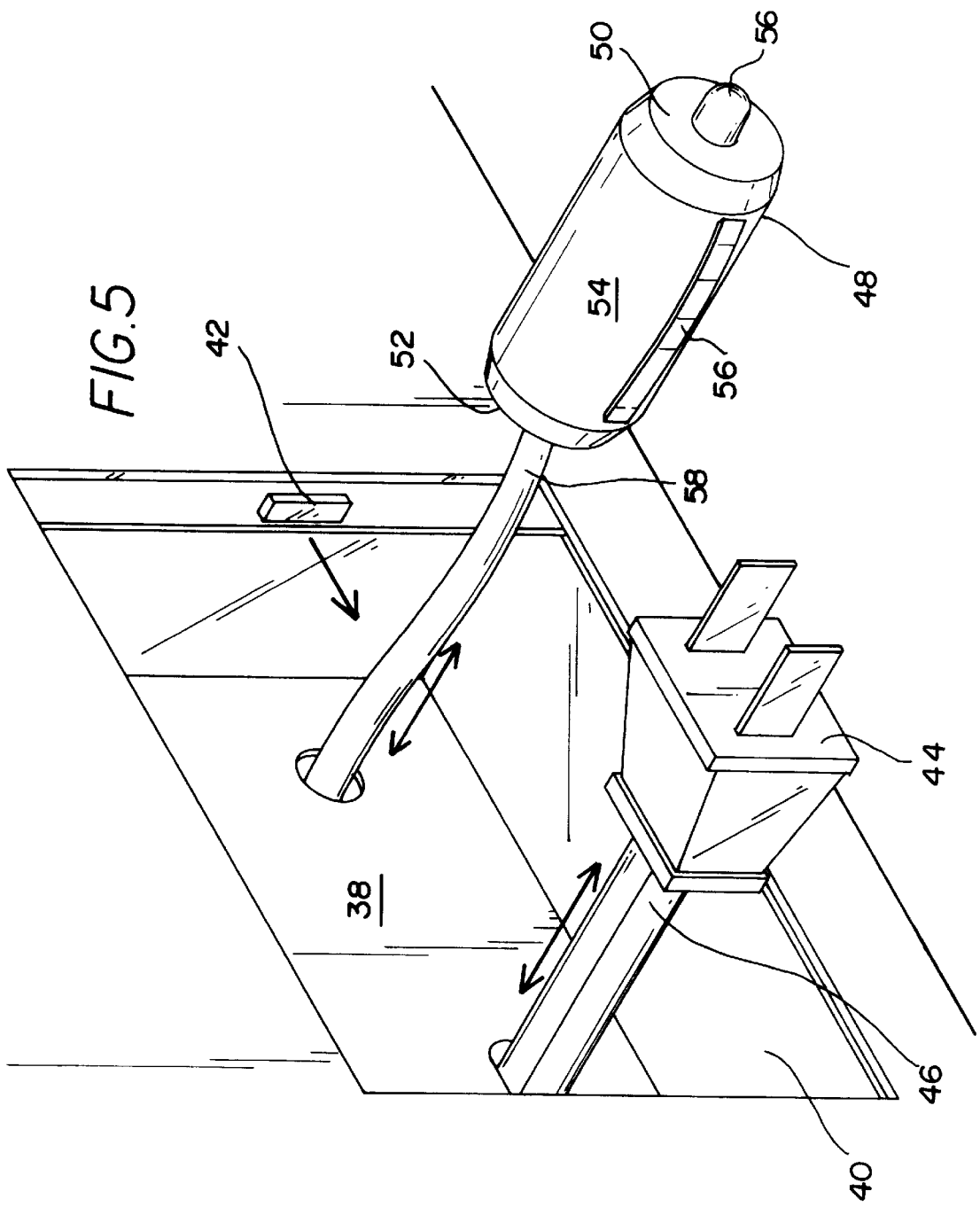

PORTABLE SELF CONTAINED BATTERY CHARGER AND RADIO

BACKGROUND OF THE INVENTION

1. Field of the Invention

The present invention relates to battery chargers and more particularly pertains to a new portable self contained battery charger and radio for charging batteries for power tools.

2. Description of the Prior Art

The use of battery chargers is known in the prior art. More specifically, battery chargers heretofore devised and utilized are known to consist basically of familiar, expected and obvious structural configurations, notwithstanding the myriad of designs encompassed by the crowded prior art which have been developed for the fulfillment of countless objective and requirements.

Known prior art includes U.S. Pat. Nos. 5,187,422; 2,591, 438; 4,214,197; 5,396,162; 5,752,205; 4,691,383; and U.S. Pat. Des. No. 307,829.

While these devices fulfill their respective, particular objectives and requirements, the aforementioned patents do not disclose a new portable self contained battery charger and radio. The inventive device includes a portable housing having a top wall which is removable form the housing. A first plug is adapted for connecting to a home electrical power outlet. The first plug is a two prong plug operationally coupled to a first cord. A second plug for a vehicle power outlet is a cylinder having a first end and a second end. A wall connects the first and second ends. The first end has an electrical contact thereon and the wall of the second plug has an electrical contact thereon. The second end of the second plug is affixed to a second cord such that the first and second electrical contacts of the second plug are electrically coupled to the second cord. The first and second plugs provide power. A power cell for transforming current is mounted within the housing and has an outlet therein adapted to receive two pronged plugs. The power cell is operationally coupled to the power supply. A sound system for transforming audio and radio signals into sound is mounted in the housing and operationally coupled to the power cell. Two speakers are mounted in the front wall, and each of the speakers is operationally coupled to the sound system. A rechargeable battery for supplying power to the power cell is operationally coupled to the power cell. A recharger compartment for inserting battery rechargers is within the housing.

In these respects, the portable self contained battery charger and radio according to the present invention substantially departs from the conventional concepts and designs of the prior art, and in so doing provides an apparatus primarily developed for the purpose of charging batteries for power tools.

SUMMARY OF THE INVENTION

In view of the foregoing disadvantages inherent in the known types of battery chargers now present in the prior art, the present invention provides a new portable self contained battery charger and radio construction wherein the same can be utilized for charging batteries for power tools.

The general purpose of the present invention, which will be described subsequently in greater detail, is to provide a new portable self contained battery charger and radio apparatus and method which has many of the advantages of the battery chargers mentioned heretofore and many novel features that result in a new portable self contained battery charger and radio which is not anticipated, rendered obvious, suggested, or even implied by any of the prior art battery chargers, either alone or in any combination thereof.

To attain this, the present invention generally comprises a portable housing having a tip wall which is removable from the housing. A first plug is adapted for connecting to a home electrical power outlet. The first plug is a two prong plug operationally coupled to a first cord. A second plug for a vehicle power outlet is a cylinder having a first end and a second end. A wall connects the first and second ends. The first end has an electrical contact thereon and the wall of the second plug has an electrical contact thereon. The second end of the second plug is affixed to a second cord such that the first and second electrical contacts of the second plug are electrically coupled to the second cord. The first and second plugs provide power. A power cell for transforming current is mounted within the housing and has an outlet therein adapted to receive two pronged plugs. The power cell is operationally coupled to the power supply. A sound system for transforming audio and radio signals into sound is mounted in the housing and operationally coupled to the power cell. Two speakers are mounted in the front wall, and each of the speakers is operationally coupled to the sound system. A rechargeable battery for supplying power to the power cell is operationally coupled to the power cell. A recharger compartment for inserting battery rechargers is within the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable self contained battery charger and radio apparatus and method which has many of the advantages of the battery chargers mentioned heretofore and many novel features that result in a new portable self contained battery charger and radio which is not anticipated, rendered obvious, suggested, or even implied by any of the prior art battery chargers, either alone or in any combination thereof.

It is another object of the present invention to provide a new portable self contained battery charger and radio which may be easily and efficiently manufactured and marketed.

It is another object of the present invention to provide a new portable self contained battery charger and radio which is of a durable and reliable construction.

An even further object of the present invention is to provide a new portable self contained battery charger and radio which is susceptible of a low cost of manufacture with regard to both materials and labor, and which accordingly is then susceptible of low prices of sale to the consuming public, thereby making such portable self contained battery charger and radio economically available to the buying public.

Still yet another object of the present invention is to provide a new portable self contained battery charger and radio which provides in the apparatuses and methods of the prior art some of the advantages thereof, while simultaneously overcoming some of the disadvantages normally associated therewith.

Still another object of the present invention is to provide a new portable self contained battery charger and radio for charging batteries for power tools.

Yet another object of the present invention is to provide a new portable self contained battery charger and radio which includes a portable housing having a top wall which is removable from the housing. A first plug is adapted for connecting to a home electrical power outlet. The first plug is a two prong plug operationally coupled to a first cord. A second plug for a vehicle power outlet is a cylinder having a first end and a second end. A wall connects the first and second ends. The first end has an electrical contact thereon and the wall of the second plug has an electrical contact thereon. The second end of the second plug is affixed to a second cord such that the first and second electrical contacts of the second plug are electrically coupled to the second cord. The first and second plugs provide power. A power cell for transforming current is mounted within the housing and has an outlet therein adapted to receive two pronged plugs. The power cell is operationally coupled to the power supply. A sound system for transforming audio and radio signals into sound is mounted in the housing and operationally coupled to the power cell. Two speakers are mounted in the front wall, and each of the speakers is operationally coupled to the sound system. A rechargeable battery for supplying power to the power cell is operationally coupled to the power cell. A recharger compartment for inserting battery rechargers is within the housing.

Still yet another object of the present invention is to provide a new portable self contained battery charger and radio that will allow the use of another recharging battery in a convenient enclosure.

Even still another object of the present invention is to provide a new portable self contained battery charger and radio that has a lid to protect the sound system form damage and air born particles such as dust and dirt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a new portable self contained battery charger and radio according to the present invention.

FIG. 2 is a schematic perspective view of the back of the present invention.

FIG. 3 is a schematic side view taken along line 3—3 of the present invention.

FIG. 4 is a schematic back view taken along line 4—4 of the present invention.

FIG. 5 is a schematic perspective view of the cavity and cords of the present invention.

DESCRIPTION OF THE PREFERRED EMBODIMENT

Figure 6:
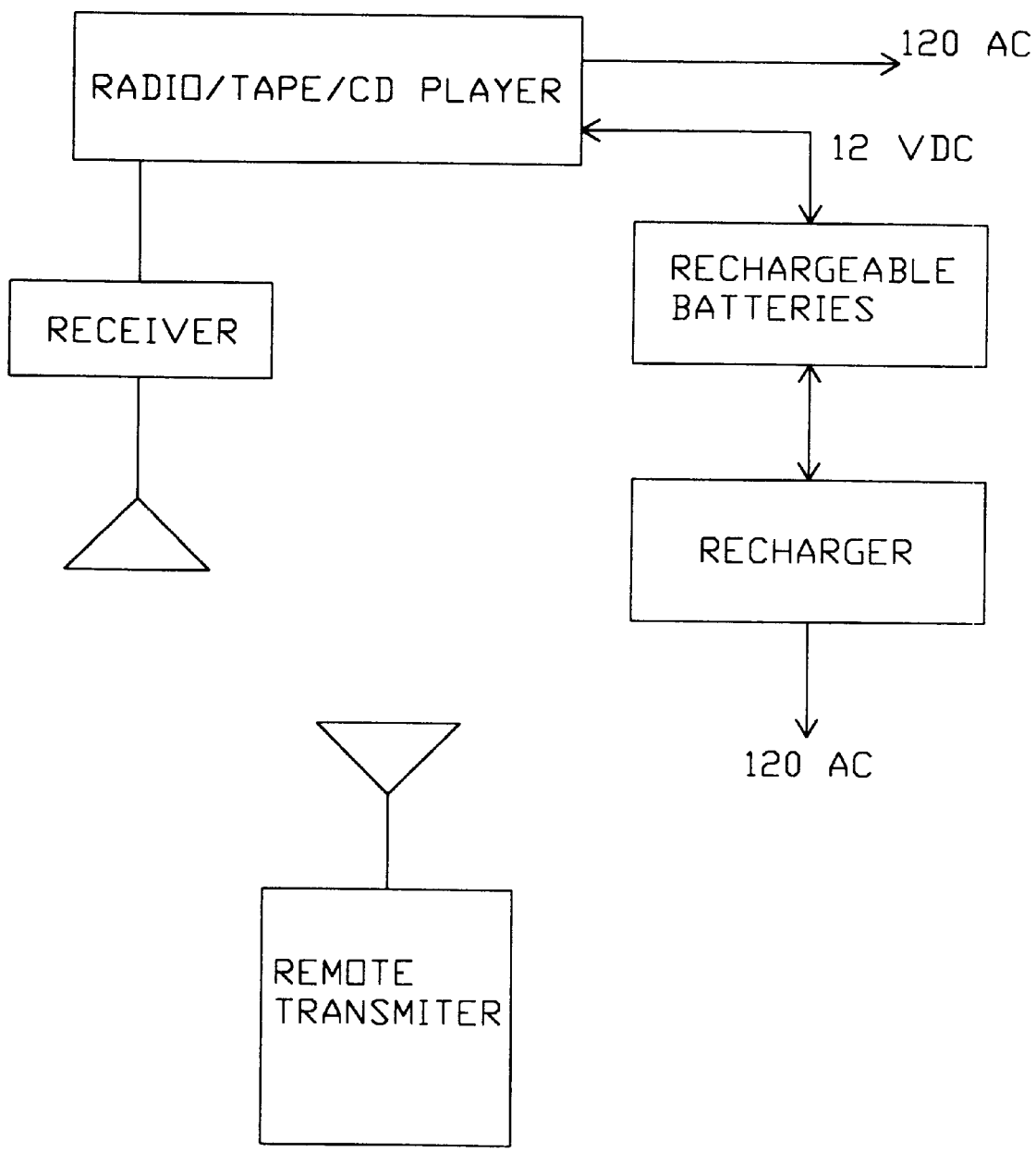
FIG. 6 is an electronic schematic view of the present invention.

With reference now to the drawings, and in particular to FIGS. 1 through 6 thereof, a new portable self contained battery charger and radio embodying the principles and concepts of the present invention and generally designated by the reference numeral 10 will be described.

As best illustrated in FIGS. 1 through 6, the portable self contained battery charger and radio 10 generally comprises a portable housing 12 having a front wall 14, a back wall 16, a first opposing side wall 18, a second opposing side wall 20, a top wall 22 and a bottom wall 24. The housing is generally rectangular. The top wall 22 is removable from the housing. The top wall has a peripheral lip extending from a periphery of the top wall downward toward the bottom wall to define a flange 26. A portion of the flange adjacent to the back wall forms a back flange wherein the back flange is hingedly coupled to the back wall with a hinge 28. The housing is comprised of a rigid plastic having a thickness greater than one-quarter inch. The added thickness allows the housing to support the weight of a person using the housing as a seat.

A handle 30 for carrying the housing is fixedly coupled to an exterior surface of the top wall 22. The handle 30 is generally located at a central location on the top wall.

A pair of clasps for securing the top wall in a closed position. Each of the clasps has a first clasp member 32 and a second clasp member 34. Each of the first clasp members is on the front wall 14 and each of the second clasp members is on the front flange 26 of the top wall. One of each of the clasps is on a generally opposite side of the housing.

A lock 36 for locking the top wall in a closed position is integrally mounted on the front flange 26 of the top wall 22. Preferably, the lock is a combination lock.

A cord box 38 for holding retracting cords has a retracting device, not shown, therein adapted to retract two cords into the cord box. The cord box 38 is located generally adjacent to a corner formed by the bottom wall 24, the back wall 16 and the first opposing side wall 18. The back wall 16 has a cavity 40 therein. The cavity 40 is located generally adjacent to the cord box 38. The cavity 40 has a slidable door 42 mounted therein which is slidable between a closed position precluding access to the cavity and an open position permitting access to the cavity.

A first plug 44 is adapted for connecting to a home electrical power outlet is a two prong plug. The first plug is operationally coupled to a first cord 46, wherein the fist cord has a length wound within the cord box 38 such that the length of the first cord may be withdrawn from the cord box.

A second plug 48 for a vehicle power outlet is also provided. The second plug is a cylinder having a first end 50 and a second end 52. A wall 54 connects the first and second ends. The first end has an electrical contact 56 thereon and the wall 54 of the second plug has an electrical contact 56 thereon. The second end 52 of the second plug is affixed to a second cord 58 such that the first and second electrical contacts of the second plug are electrically coupled to the second cord. The second cord 58 has a length wound within the cord box 38 such that the length of the second cord may be withdrawn from the cord box. The first 44 and second plugs 48 provide power to the housing. Ideally, the first and second cords are retractable cords which are automatically pulled into the housing.

A power cell 60 for transforming current has an outlet 62 therein adapted to receive two pronged plugs. In another embodiment, not shown, the power cell has multiple outlets therein. The power cell 60 is operationally coupled to the cords 48, 44. The power cell is located within the housing 12 adjacent to the bottom wall 24 and the back wall 16.

A sound system 64 for transforming audio and radio signals into sound is mounted in the housing 12. Preferably, the sound system is in a central portion of the housing. The sound system is mounted across an interior of the housing such that the sound system is mounted to the front wall 14 and the back wall 16. The sound system is generally equidistant from the first opposing wall 18 and the second opposing wall 20. The sound system is operatively coupled to the power cell 60. The sound system comprises a plurality of components operationally coupled together. Ideally, the components, not shown, of the sound system include a radio receiver for transforming radio waves into sound, a compact disc player for playing compact discs, and a tape deck for playing audio tapes. The sound system could also come with a remote control device, shown in FIG. 6, for remotely controlling the radio functions.

Two speakers 66 are mounted in the front wall 14. The speakers is generally round and have a front portion 68 and back portion 70 such that the front portion is open to an exterior of the housing and the back portion extends into within the interior of the housing. Each of the speakers 66 is operationally coupled to the sound system 64.

A rechargeable battery 72 for supplying power to the power cell 60 when external power from the first 44 and second plugs 48 is unavailable is mounted generally in a portion of the housing defined by the back wall 16, front wall 14, top wall 22 and first opposing wall 18. The rechargeable battery is operationally coupled to the power cell.

A recharger compartment 74 for inserting battery rechargers is defined by the space between the second opposing wall 20 and the sound system 64. The recharging compartment preferably has a covering 76 thereon. The covering is generally planar and is substantially located in a plane defined by a top edge of the front wall 14 and a top edge of the back wall 16. The covering is perforated to define sections such that portion of the covering may be removed to create an opening corresponding to a size of a battery recharger 78. This allows all battery rechargers to be placed in the housing.

In use, one of the plugs is plugged into a power outlet. The plug used will depend on what type of outlet is available. Plugging the plug into a power outlet will charge the rechargeable battery 72 located in the housing 12. Once this battery is charged, the housing becomes a portable battery charger. The battery is also capable of powering the sound system 64 without a power outlet. Power tools generally have recharging stations or rechargers 78 for their batteries. The charging station is placed in the recharging compartment. The covering 76 of the compartment is perforated to allow section to be removed to make the compartment the correct size for the charging station which is plugged into the power cell 60. When the battery for the tool needs recharging, it is plugged into its charging station and the charging station draws power from the battery in the housing. Optionally, a remote control device can be employed to control the sound system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self contained battery charging system, comprising:

a portable housing having a top wall, said top wall being removable from said housing;

a first plug for adapted for connecting to a home electrical power outlet, said first plug being a two prong plug, said first plug being operationally coupled to a first cord;

a second plug for a vehicle power outlet, said second plug being a cylinder having a first end and a second end, said first and second ends being connected by a wall, said first end having an electrical contact thereon, said wall of said second plug having an electrical contact thereon, said second end of said second plug being affixed to a second cord such that said first and second electrical contacts of said second plug are electrically coupled to said second cord;

wherein said first and second plugs provide power;

a power cell for transforming current, said power cell being mounted within said housing, said power cell having an outlet therein adapted to receive two pronged plugs, said power cell being operationally coupled to said first and second cords;

a sound system for transforming audio and radio signals into sound, said sound system being mounted in said housing, said sound system being operationally coupled to said power cell;

two speakers, said speakers being mounted in said front wall, each of said speakers being operationally coupled to said sound system;

a rechargeable battery for supplying power to said power cell when external power from said first and second plugs is unavailable, said rechargeable battery being operationally coupled to said power cell; and a recharger compartment for inserting battery rechargers, said compartment being within said housing.

2. The self contained battery charging system as in claim 1, wherein said housing comprises:

said housing having a front wall, a back wall, a first opposing side wall, a second opposing side wall and a bottom wall, said housing being generally rectangular, said top wall having a peripheral lip, said peripheral lip extending from a periphery of said top wall downward toward said bottom wall to define a flange, a portion of said flange adjacent to said back wall forming a back flange wherein said back flange is hingedly coupled to said back wall;

a handle for carrying said housing, said handle being fixedly coupled to an exterior surface of said top wall, said handle being generally located at a central location on said top wall.

3. The self contained battery charging system as in claim 2, further comprising:

a pair of clasps for securing said top wall in a closed position, each of said clasps having a first clasp member and a second clasp member, each of said first clasp members being on said front wall, each of said second clasp members being on a front flange of said top wall, one of each of said clasps being on a generally opposite side of said housing;

a lock for locking said top wall in a closed position, said lock being integrally mounted on said front flange of said top wall, said lock being a combination lock.

4. The self contained battery charging system as in claim 1, further including:

a cord box for holding retracting cords, said cord box having a retracting device therein adapted to retract said first and said second cords into said cord box, said cord box being located in said housing generally adjacent to a back wall of said housing, said back wall having a cavity therein, said cavity being located generally adjacent to said cord box, said cavity having a slidable door mounted therein, said slidable door being slidable between a closed position precluding access to said cavity and an open position permitting access to said cavity.

5. The self contained battery charging system as in claim 4, wherein said fist cord has a length wound within said cord box such that said length of said first cord is may be withdrawn from said cord box, and wherein said second cord has a length wound within said cord box such that said length of said second cord may be withdrawn from said cord box.

6. The self contained battery charging system as in claim 1, wherein said sound system comprises:

said sound system being in a central portion of said housing, said sound system being mounted across an interior of said housing such that said sound system is mounted to a front wall and a back wall of said housing, said sound system comprising a plurality of components operationally coupled together, said components of said sound system comprising:

a radio receiver for transforming radio waves into sound;

a compact disc player for playing compact discs; and a tape deck for playing audio tapes.

7. The self contained battery charging system as in claim 1, further including:

a covering for said recharging compartment, said covering being generally planar, said covering being perforated to define sections such that portions of said covering may be removed to create an opening corresponding to a size of a battery recharger.

8. A self contained battery charging system, comprising:

a portable housing having a front wall, a back wall, a first opposing side wall, a second opposing side wall, a top wall and a bottom wall, said housing being generally rectangular, said top wall being removable from said housing, said top wall having a peripheral lip, said peripheral lip extending from a periphery of said top wall downward toward said bottom wall to define a flange, a portion of said flange adjacent to said back wall forming a back flange wherein said back flange is hingedly coupled to said back wall, each of said walls comprising plastic, each of said walls having a thickness greater than one-quarter inch;

a handle for carrying said housing, said handle being fixedly coupled to an exterior surface of said top wall, said handle being generally located at a central location on said top wall;

a pair of clasps for securing said top wall in a closed position, each of said clasps having a first clasp member and a second clasp member, each of said first clasp members being on said front wall, each of said second clasp members being on a front flange of said top wall, one of each of said clasps being on a generally opposite side of said housing;

a lock for locking said top wall in a closed position, said lock being integrally mounted on said front flange of said top wall, said lock being a combination lock;

a cord box for holding retracting cords, said cord box having a retracting device therein adapted to retract two cords into said cord box, said cord box being located generally adjacent to a corner formed by said bottom wall, said back wall and said first opposing side wall, said back wall having a cavity therein, said cavity being located generally adjacent to said cord box, said cavity having a slidable door mounted therein, said slidable door being slidable between a closed position precluding access to said cavity and an open position permitting access to said cavity;

a first plug for adapted for connecting to a home electrical power outlet, said first plug being a two prong plug, said first plug being operationally coupled to a first cord, wherein said fist cord has a length wound within said cord box such that said length of said first cord is may be withdrawn from said cord box;

a second plug for a vehicle power outlet, said second plug being a cylinder having a first end and a second end, said first and second ends being connected by a wall, said first end having an electrical contact thereon, said wall of said second plug having an electrical contact thereon, said second end of said second plug being affixed to a second cord such that said first and second electrical contacts of said second plug are electrically coupled to said second cord, said second cord having a length wound within said cord box such that said length of said second cord may be withdrawn from said cord box, said first and second cords being retractable cords;

wherein said first and second plugs provide power;

a power cell for transforming current, said power cell having an outlet therein adapted to receive two pronged plugs, said power cell being operationally coupled to said first and second cords, said power cell being located within said housing adjacent to said bottom wall and said back wall;

a sound system for transforming audio and radio signals into sound, said sound system being mounted in said housing, said sound system being in a central portion of said housing, said sound system being mounted across an interior of said housing such that said sound system is mounted to said front wall and said back wall, said sound system being generally equidistant from said first opposing wall and said second opposing wall, said sound system being operatively coupled to said power cell, said sound system comprising a plurality of components operationally coupled together, said components of said sound system comprising:
  a radio receiver for transforming radio waves into sound;
  a compact disc player for playing compact discs;
  a tape deck for playing audio tapes;
two speakers, said speakers being mounted in said front wall, said speakers being generally round, said speakers having a front portion and back portion such that said front portion is open to an exterior of said housing and said back portion extends into within said interior of said housing, each of said speakers being operationally coupled to said sound system;

a rechargeable battery for supplying power to said power cell when external power from said first and second plugs is unavailable, said rechargeable battery being mounted generally in a portion of said housing defined by said back wall, front wall, top wall and first opposing wall, said rechargeable battery being operationally coupled to said power cell; and a recharger compartment for inserting battery rechargers, said compartment being defined by the space between said second opposing wall and said sound system, said recharging compartment having a covering thereon, said covering being generally planar, said covering being substantially located in a plane defined by a top edge of said front wall and a top edge of said back wall, said covering being perforated to define sections such that portions of said covering may be removed to create an opening corresponding to a size of a battery recharger, said recharger compartment being adapted for receiving variously sized rechargers.

\* \* \* \* \*